US012497829B2

(12) United States Patent
Denton

(10) Patent No.: US 12,497,829 B2
(45) Date of Patent: Dec. 16, 2025

(54) SECURITY MESH INSERT FOR DOOR

(71) Applicant: Douglas A. Denton, Sacramento, CA (US)

(72) Inventor: Douglas A. Denton, Sacramento, CA (US)

( * ) Notice: Subject to any disclaimer, the term of this patent is extended or adjusted under 35 U.S.C. 154(b) by 235 days.

(21) Appl. No.: 18/233,320

(22) Filed: Aug. 13, 2023

(65) Prior Publication Data

US 2025/0052111 A1 Feb. 13, 2025

(51) Int. Cl.
*E06B 9/52* (2006.01)
*E05C 19/00* (2006.01)

(52) U.S. Cl.
CPC .............. *E06B 9/52* (2013.01); *E05C 19/003* (2013.01)

(58) Field of Classification Search
CPC ........ E06B 9/52; E06B 2009/527; E06B 7/28; E06B 7/30; E06B 7/32; E06B 9/01; E06B 2009/005; E06B 2009/015; E05C 19/003
See application file for complete search history.

(56) References Cited

U.S. PATENT DOCUMENTS 75,612 A * 3/1868 Wharry ..................... E06B 9/52 160/97
241,485 A * 5/1881 Garcin et al. ............. E06B 7/30 454/195
399,388 A * 3/1889 Dunn ........................ E06B 9/01 428/3
435,943 A * 9/1890 Nelson ...................... E06B 9/52 52/657
690,662 A * 1/1902 Perrin ..................... E06B 9/522 160/105
730,230 A * 6/1903 Burrowes ................. E06B 9/52 160/395
858,230 A * 6/1907 Symonds .................. E06B 9/01 49/56
1,010,326 A * 11/1911 Thornley .................. E06B 9/01 52/799.12
1,014,701 A * 1/1912 Grant ........................ E06B 9/52 160/16
1,036,801 A * 8/1912 Couplin .................... E06B 9/52 160/40
1,056,541 A * 3/1913 Hess ......................... E06B 9/52 52/656.7
1,075,500 A * 10/1913 Schmits .................... E06B 9/52 160/378
1,087,757 A * 2/1914 Gebhardt .................. E06B 9/52 160/17

(Continued)

*Primary Examiner* — Daniel P Cahn
*Assistant Examiner* — John W Hanes, Jr.
(74) *Attorney, Agent, or Firm* — Craig A. Simmermon

(57) ABSTRACT

A high strength mesh insert that can be installed into any type of door such as solid doors, hollow doors, interior doors, and exterior doors. The insert includes: a nine panel mesh insert, an exterior trim assembly, an interior trim assembly, an internal door hatch, and a plurality of fasteners. The shape of the nine panel mesh insert provides superior strength to the insert wherein a properly installed insert can withstand several hard blows from a sledge hammer without breaking or breaching. The insert provides high strength security but also allows for air ventilation and sound transfer between the interior and exterior sides of the door when the internal hatch door is open. The internal hatch door may also be closed to prevent air ventilation and sound transfer.

2 Claims, 5 Drawing Sheets

(56) References Cited

U.S. PATENT DOCUMENTS

| | | | | | |
|---|---|---|---|---|---|
| 1,100,564 | A | * | 6/1914 | Heryford | E06B 9/52 49/168 |
| 1,104,151 | A | * | 7/1914 | Stein | E06B 9/52 55/DIG. 32 |
| 1,186,517 | A | * | 6/1916 | Ohnstrand | E06B 9/52 160/381 |
| 1,342,237 | A | * | 6/1920 | Thomas | E06B 7/28 16/382 |
| 1,351,940 | A | * | 9/1920 | Blake | E06B 9/52 160/395 |
| 1,445,534 | A | * | 2/1923 | Miller | E06B 9/52 160/404 |
| 1,554,858 | A | * | 9/1925 | Kopp | E06B 9/01 160/394 |
| 1,573,194 | A | * | 2/1926 | Roe | E06B 9/52 160/91 |
| 1,670,372 | A | * | 5/1928 | Matchette | E06B 7/32 49/70 |
| 1,859,974 | A | * | 5/1932 | Kroenke | E06B 9/52 49/169 |
| 1,935,887 | A | * | 11/1933 | Murphy | E06B 7/30 49/63 |
| 2,027,491 | A | * | 1/1936 | Percy | E06B 7/32 52/27 |
| 2,153,454 | A | * | 4/1939 | Butler | E06B 9/52 403/376 |
| 2,246,580 | A | * | 6/1941 | Farmer | E06B 9/01 220/8 |
| 2,568,139 | A | * | 9/1951 | Behnke | E06B 9/52 160/404 |
| 2,771,643 | A | * | 11/1956 | Zelov | E06B 7/28 52/630 |
| 3,226,776 | A | * | 1/1966 | Wormer | E06B 7/32 D6/555 |
| 3,289,376 | A | * | 12/1966 | Brown | E06B 9/01 52/799.12 |
| 3,461,940 | A | * | 8/1969 | Brynjelson | E06B 7/28 160/381 |
| 3,634,986 | A | * | 1/1972 | Ford | E06B 7/28 52/316 |
| 3,871,434 | A | * | 3/1975 | Hance | E06B 9/01 160/91 |
| 3,885,335 | A | * | 5/1975 | Egermayer | G09F 1/12 160/397 |
| 3,985,174 | A | * | 10/1976 | Bricker | E06B 7/32 160/180 |
| 4,053,007 | A | * | 10/1977 | Griffith | E06B 7/32 160/354 |
| 4,127,156 | A | * | 11/1978 | Brandt | E06B 9/01 160/369 |
| 4,193,235 | A | * | 3/1980 | Cucchiara | E06B 3/285 52/745.16 |
| 4,231,412 | A | * | 11/1980 | Nowak | E06B 9/52 160/181 |
| 4,261,418 | A | * | 4/1981 | Helt | F28F 19/006 62/298 |
| 4,355,478 | A | * | 10/1982 | Armstrong | E06B 9/52 40/616 |
| 4,453,365 | A | * | 6/1984 | Gladden | E04F 15/02435 52/800.1 |
| 4,480,407 | A | * | 11/1984 | Needham | E06B 7/32 49/478.1 |
| 4,603,724 | A | * | 8/1986 | Borwick | E06B 7/32 160/180 |
| 4,637,444 | A | * | 1/1987 | Tanner | E06B 9/01 49/501 |
| 4,839,989 | A | * | 6/1989 | McConnell | E06B 7/30 49/394 |
| 4,856,575 | A | * | 8/1989 | Wells | A01K 1/035 29/445 |
| 5,141,046 | A | * | 8/1992 | Duncan | E06B 9/52 D25/48.8 |
| 5,269,097 | A | * | 12/1993 | Davlantes | E05C 9/00 49/169 |
| 5,282,504 | A | * | 2/1994 | Anderson | E06B 9/02 49/64 |
| 5,365,706 | A | * | 11/1994 | Elsenpeter | E06B 7/30 49/169 |
| 5,581,940 | A | * | 12/1996 | Peterson | E06B 7/32 49/386 |
| D402,356 | S | * | 12/1998 | Hodge | D23/365 |
| 5,967,215 | A | * | 10/1999 | Needham | E06B 7/32 160/180 |
| 6,112,496 | A | * | 9/2000 | Hugus | E06B 3/822 52/800.17 |
| 6,161,334 | A | * | 12/2000 | Goodin | A01K 1/0017 49/55 |
| 6,174,340 | B1 | * | 1/2001 | Hodge | B01D 46/10 55/482 |
| 6,213,187 | B1 | * | 4/2001 | Hughes | E06B 7/09 160/90 |
| 6,331,223 | B1 | * | 12/2001 | Wylie | E06B 9/52 160/371 |
| 6,397,541 | B1 | * | 6/2002 | Brewer | E06B 3/7001 52/311.1 |
| 6,430,954 | B1 | * | 8/2002 | Smith | F24F 1/58 206/320 |
| 6,506,112 | B1 | * | 1/2003 | Halbleib | E05C 17/16 454/225 |
| 6,681,524 | B1 | * | 1/2004 | Tillson | E06B 7/32 160/180 |
| 6,745,515 | B1 | * | 6/2004 | Chen | E05B 65/10 160/180 |
| 6,772,826 | B1 | * | 8/2004 | Barnett | F24S 40/10 165/47 |
| 6,886,300 | B2 | * | 5/2005 | Hudoba | E06B 9/52 160/381 |
| 6,892,787 | B1 | * | 5/2005 | Stretch | E06B 9/52 160/371 |
| 7,032,402 | B2 | * | 4/2006 | Braswell | F24F 1/58 62/507 |
| 7,174,939 | B1 | * | 2/2007 | Spencer | E06B 9/04 160/90 |
| 7,207,372 | B2 | * | 4/2007 | Dorest | E06B 7/02 160/180 |
| 7,416,577 | B2 | * | 8/2008 | Simmons | B01D 46/10 55/491 |
| 7,448,668 | B2 | * | 11/2008 | Brabeck | B60P 3/36 160/180 |
| 7,484,286 | B2 | * | 2/2009 | Fowler | E06B 9/52 160/113 |
| 7,775,002 | B2 | * | 8/2010 | Puchniak | E06B 9/02 160/135 |
| 7,984,695 | B1 | * | 7/2011 | Shaffer | E06B 7/32 119/501 |
| 8,528,279 | B1 | * | 9/2013 | Greene, Jr. | E06B 9/01 49/55 |
| 8,793,932 | B1 | * | 8/2014 | Lindgren | E06B 3/685 49/63 |
| 8,881,788 | B1 | * | 11/2014 | Spencer | E06B 9/52 160/180 |
| 9,140,054 | B2 | * | 9/2015 | Oberbroeckling | E06B 3/5892 |
| 9,200,481 | B2 | * | 12/2015 | Walther | E06B 1/52 |
| 9,295,900 | B1 | * | 3/2016 | Dixon, Jr. | E06B 1/16 |
| 9,926,737 | B2 | * | 3/2018 | Wanjohi | A47G 29/126 |
| 9,938,761 | B2 | * | 4/2018 | Siddiqui | E06B 3/7015 |
| 10,040,149 | B2 | * | 8/2018 | Simmons | F24F 13/084 |
| 10,612,298 | B1 | * | 4/2020 | Jackson | E06B 3/4654 |
| 10,837,228 | B2 | * | 11/2020 | Roberts | E06B 9/52 |
| 10,844,995 | B1 | * | 11/2020 | Wang | E06B 7/28 |
| 10,859,288 | B1 | * | 12/2020 | Carnegie | F16M 13/02 |
| 11,484,024 | B1 | * | 11/2022 | Gardner | E06B 9/52 |
| 11,530,571 | B1 | * | 12/2022 | Godwin | E06B 7/32 |
| 11,866,991 | B1 | * | 1/2024 | Fernandez | E06B 7/32 |
| 12,060,743 | B2 | * | 8/2024 | Miller | A01K 27/009 |
| 12,144,448 | B1 | * | 11/2024 | McCollum | A47G 29/141 |
| 12,252,933 | B1 | * | 3/2025 | Iles | E06B 9/52 |

(56) References Cited

U.S. PATENT DOCUMENTS

2003/0046887 A1* 3/2003 Chubb ........................ E06B 1/30 49/504
2003/0136351 A1* 7/2003 Morgan ..................... E06B 7/32 119/484
2004/0113796 A1* 6/2004 Noyes ..................... A01K 1/035 340/573.3
2004/0172894 A1* 9/2004 Doonan ..................... E06B 9/52 52/204.5
2005/0055905 A1* 3/2005 Sayer ........................ F23M 7/02 52/204.5
2005/0072074 A1* 4/2005 Moore ....................... E06B 7/03 52/302.1
2005/0166493 A1* 8/2005 Martin ....................... E06B 7/28 52/204.1
2006/0010792 A1* 1/2006 Biggers ..................... E06B 9/02 52/202
2006/0179719 A1* 8/2006 Christie ..................... E06B 7/32 49/169
2008/0134584 A1* 6/2008 McGhee .................... E06B 7/32 277/355
2008/0251183 A1* 10/2008 Turner .................. B29C 44/351 52/656.5
2008/0282613 A1* 11/2008 Heads ........................ E06B 9/01 49/50
2009/0199983 A1* 8/2009 Edlin ......................... E06B 9/52 160/378
2009/0243339 A1* 10/2009 Orr ......................... B60J 5/0487 160/368.1
2010/0043340 A1* 2/2010 Yan ........................... E06B 5/11 52/656.4
2010/0175336 A1* 7/2010 Sullivan ................ E06B 3/4636 49/70
2012/0247056 A1* 10/2012 Sawyers ................... E06B 9/52 29/525.08
2012/0304585 A1* 12/2012 Coatwala .............. E06B 3/5892 52/745.15
2013/0186264 A1* 7/2013 Errington .................. F41H 5/24 248/230.1
2014/0020312 A1* 1/2014 Seiling ....................... E06B 7/28 52/173.3
2014/0033639 A1* 2/2014 Walther ..................... E06B 1/52 52/745.16
2014/0138035 A1* 5/2014 Potter ................... E04B 2/7427 160/135
2014/0178628 A1* 6/2014 Hoffmann .............. A01K 1/035 428/100
2014/0259948 A1* 9/2014 Oberbroeckling .... E06B 3/5892 49/463
2015/0121760 A1* 5/2015 Drohan ...................... E06B 7/30 49/86.1
2015/0159425 A1* 6/2015 Algar ......................... E06B 9/52 24/303
2015/0191967 A1* 7/2015 Finch ...................... G09G 5/363 345/522
2017/0081863 A1* 3/2017 Bramble ................ F21S 11/007
2017/0145731 A1* 5/2017 Bolick ..................... E06B 3/685
2017/0175379 A1* 6/2017 Ferrer Garcia ........... E06B 3/48
2017/0275944 A1* 9/2017 LaPlaca ..................... E06B 7/03
2017/0314326 A1* 11/2017 Johnson .................. E06B 3/968
2018/0119481 A1* 5/2018 Ghanizadehgrayli ... F24F 13/28
2018/0185970 A1* 7/2018 Simmons ........... B01D 46/0005
2018/0258695 A1* 9/2018 Earles ................... F21V 33/006
2019/0085619 A1* 3/2019 Grube ........................ E06B 7/32
2019/0128030 A1* 5/2019 Bacon ........................ E05C 7/02
2019/0144098 A1* 5/2019 Gallagher, Jr. ..... E05D 15/0604 244/118.5
2019/0234138 A1* 8/2019 Zacher ....................... E06B 7/32
2019/0267933 A1* 8/2019 Janowski .................. E06B 9/24
2019/0316411 A1* 10/2019 Vanek ........................ E06B 7/32
2019/0338583 A1* 11/2019 Jude .......................... E06B 7/34
2020/0018112 A1* 1/2020 Coe ..................... E05B 15/1614
2020/0173230 A1* 6/2020 Seuberling ................ E06B 9/52
2020/0256115 A1* 8/2020 Vitello ....................... E06B 9/15
2020/0392780 A1* 12/2020 Vitello ....................... E06B 7/30
2021/0010325 A1* 1/2021 Roberts ..................... E06B 9/52
2021/0059456 A1* 3/2021 Fontanilla .............. A47G 29/16
2021/0062572 A1* 3/2021 Ogawa ...................... H04N 5/64
2021/0079719 A1* 3/2021 Vanderbilt-Kay ........ E06B 7/28
2021/0087875 A1* 3/2021 Roberts ..................... E06B 9/52
2021/0131172 A1* 5/2021 Johnson .................... E06B 9/52
2021/0164288 A1* 6/2021 Ege ....................... E06B 3/7001
2021/0207431 A1* 7/2021 Kim ...................... A47G 29/141
2021/0207434 A1* 7/2021 De La Porte ............. E06B 9/52
2021/0238912 A1* 8/2021 Harter ....................... E06B 1/36
2021/0404247 A1* 12/2021 Schwartz ................ E05C 19/08
2022/0031105 A1* 2/2022 Newcomb .......... G07C 9/00309
2022/0065031 A1* 3/2022 Bungard ................ A01K 1/033
2022/0232798 A1* 7/2022 Dix ........................... E06B 7/32
2022/0282562 A1* 9/2022 Daniels ..................... E06B 5/11
2022/0298857 A1* 9/2022 LaPlaca .................. E06B 9/522
2022/0356752 A1* 11/2022 Taylor ....................... E06B 7/18
2022/0412157 A1* 12/2022 Lain .......................... E06B 7/32
2023/0023106 A1* 1/2023 Thomson .................. E06B 7/32
2023/0160259 A1* 5/2023 Cao ...................... A47B 96/021 160/369
2023/0243210 A1* 8/2023 Blakemore ............... E06B 9/01 160/371
2023/0250688 A1* 8/2023 Godwin .................... E06B 7/32 49/70
2023/0280068 A1* 9/2023 Fiello .................... E04B 1/7076 454/275
2024/0200400 A1* 6/2024 Davlantes ................. E06B 7/32
2025/0027365 A1* 1/2025 Kerr .......................... E06B 7/32
2025/0052111 A1* 2/2025 Denton ................. E05C 19/003

* cited by examiner

SECURITY MESH INSERT FOR DOOR

BACKGROUND OF THE INVENTION

1. Field of the Invention

This invention relates to security mesh insert for a door and more particularly to a high strength mesh insert that can be installed into any door. The high strength mesh insert prevents people or animals from getting through the mesh insert or the door because of its unique design and high strength material while still allowing for sound transfer and air ventilation through the vent in the door.

2. Description of Related Art

There are other security inserts for doors in the prior art, however, there are none with the specific design and aspects as shown and described below. Security mesh insert for door includes a special high strength nine panel insert that has been tested to withstand multiple hard blows from a sledge hammer without breach or breaking when properly installed into a door.

BRIEF SUMMARY OF THE INVENTION

It is an aspect of security mesh insert to be installed into any door solid or hollow.

It is an aspect of security mesh insert to withstand several hard blows from a sledge hammer without failing or breaching.

It is an aspect of security mesh insert to include a high strength nine panel mesh insert.

It is an aspect of high strength nine panel mesh insert to be installed into a rectangular or square hole cut into any door.

It is an aspect of security mesh insert to include and interior hatch door that may be opened or locked closed.

When interior hatch door is open, air may freely circulate between the interior and exterior of the door.

When interior hatch door is open, sound may freely travel between the interior and exterior of the door.

DEFINITION LIST

Figure 1:
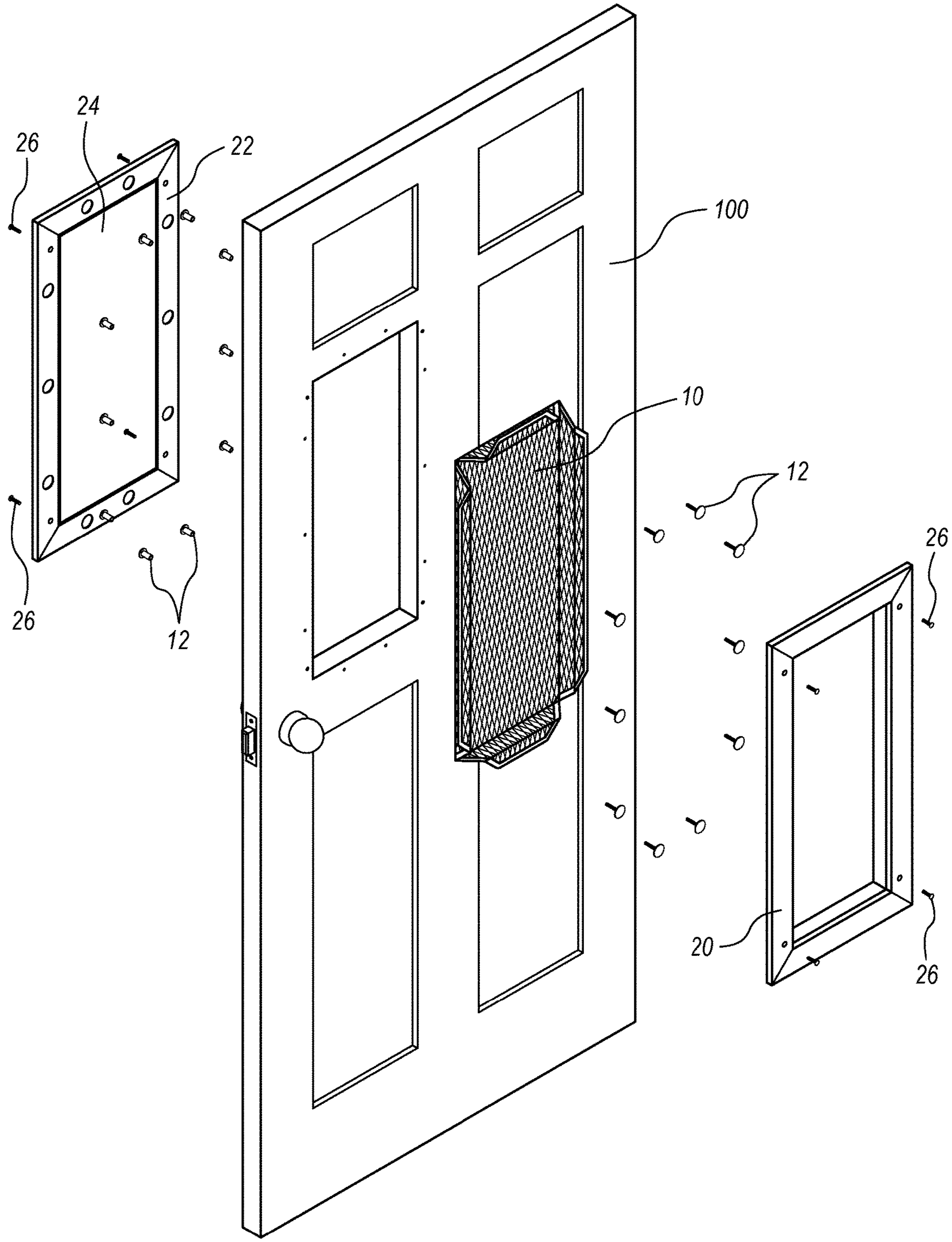
FIG. 1 is a perspective assembly view of security mesh insert and a door.

| Term | Definition |
|---|---|
| 10 | Nine Panel Mesh Insert |
| 12 | Nine Panel Mesh Insert Fastener |

-continued

DEFINITION LIST

| Term | Definition |
|---|---|
| 20 | Exterior Trim Assembly |
| 22 | Interior Trim Assembly |
| 24 | Interior Hatch Door |
| 26 | Trim Fastener |
| 28 | Hinge |
| 30 | Latch |
| 32 | Knob |
| 100 | Door |

DETAILED DESCRIPTION OF THE INVENTION

Security mesh insert for door comprises: a nine panel mesh insert 10; a plurality of nine panel mesh insert fasteners 12; an exterior trim assembly 20; an interior trim assembly 22; and a plurality of trim fasteners 26. Security mesh insert for door can be installed into any type of door 100, including solid doors, hollow doors, interior doors, and exterior doors.

Nine panel mesh insert 10 is a rigid structure made of nine rigid panel members. All nine rigid panel members are a rigid sheet or panel of meshed or apertured material. As detailed below, all nine rigid members are attached or connected together to form one nine-paneled rigid structure. In best mode, all nine panels are made from one piece or one sheet of rigid meshed or apertured material where the panels are formed by bending or braking the sheet of rigid meshed or apertured material into the specific nine-paneled structure shown and described. Nine panel mesh insert 10 is essential to the high-strength aspect of this invention wherein the specific design of the nine panel mesh insert 10 and it is installed into a door 100 imparts the high-strength and durability aspects into the invention.

Nine panel mesh insert 10 comprises: a face panel; a first rim panel; a second rim panel; a third rim panel; a fourth rim panel; a first exterior flange panel; a second exterior flange panel; a third exterior flange panel; and a fourth exterior flange panel. Nine panel mesh insert 10 may be made of any known material such as: metal, steel, aluminum, polymer, plastic, composite, wood, fiberglass, ceramic, carbon fiber, or any other known material.

Face panel is a rigid rectangular or square shaped planar member with a plurality of holes or apertures therein. Face panel is made of rigid meshed material or apertured material that is a strong rigid sheet of material with a plurality of holes, gaps, openings, slits, slots, perforations, vents, or similar to form a meshed material or apertured material. Face panel is the largest panel of the nine panel insert 10, as depicted. Face panel is a vertical member, as depicted. Face panel has a width, length, a thickness, first edge, a second edge, a third edge, and a fourth edge. The first edge of face panel is the upper horizontal edge of face panel or the edge of face panel that is closest to the ceiling of room. The second edge of face panel is the right vertical edge of face panel as viewed from the exterior side of the door 100. The third edge of face panel is the lower horizontal edge of face panel or the edge of face panel that is closest to the floor of the room. The fourth edge of face panel is the left vertical edge of face panel as viewed from the exterior side of door 100.

First rim panel is a rigid trapezoid shaped planar member with a plurality of holes or apertures therein. First rim panel is made of rigid meshed material or apertured material that is a strong rigid sheet of material with a plurality of holes, gaps, openings, slits, slots, perforations, vents, or similar to form a meshed material or apertured material. First rim panel has a width, overall length, a thickness, a first edge, a second edge, a third edge, and a fourth edge. The first edge of first rim panel is the longest edge of the trapezoid. The first edge of first rim panel is a horizontal member, as depicted. The first edge of first rim panel is rigidly attached to the first edge of face panel so that the plane of first rim panel is perpendicular to the plane of face panel. Rigid attachment may be accomplished by any known means such as: brake bending, pressed seam, weld, solder, glue, epoxy, adhesive, bolts, screws, rivets, clips, snaps, pins, or fasteners. In best mode, face panel and first rim panel are made from the same sheet of material and the two panel are made by bending a single piece of material into the two panels.

Second rim panel is a rigid trapezoid shaped planar member with a plurality of holes or apertures therein. Second rim panel is made of rigid meshed material or apertured material that is a strong rigid sheet of material with a plurality of holes, gaps, openings, slits, slots, perforations, vents, or similar to form a meshed material or apertured material. Second rim panel has a width, overall length, a thickness, a first edge, a second edge, a third edge, and a fourth edge. The first edge of second rim panel is the longest edge of the trapezoid. The first edge of second rim panel is a vertical member, as depicted. The first edge of second rim panel is rigidly attached to the second edge of face panel so that the plane of second rim panel is perpendicular to the plane of face panel. Rigid attachment may be accomplished by any known means such as: brake bending, pressed seam, weld, solder, glue, epoxy, adhesive, bolts, screws, rivets, clips, snaps, pins, or fasteners. In best mode, face panel and second rim panel are made from the same sheet of material and the two panel are made by bending a single piece of material into the two panels.

Third rim panel is a rigid trapezoid shaped planar member with a plurality of holes or apertures therein. Third rim panel is made of rigid meshed material or apertured material that is a strong rigid sheet of material with a plurality of holes, gaps, openings, slits, slots, perforations, vents, or similar to form a meshed material or apertured material. Third rim panel has a width, overall length, a thickness, a first edge, a second edge, a third edge, and a fourth edge. The first edge of third rim panel is the longest edge of the trapezoid. The first edge of third rim panel is a horizontal member, as depicted. The first edge of third rim panel is rigidly attached to the third edge of face panel so that the plane of third rim panel is perpendicular to the plane of face panel. Rigid attachment may be accomplished by any known means such as: brake bending, pressed seam, weld, solder, glue, epoxy, adhesive, bolts, screws, rivets, clips, snaps, pins, or fasteners. In best mode, face panel and third rim panel are made from the same sheet of material and the two panel are made by bending a single piece of material into the two panels.

Fourth rim panel is a rigid trapezoid shaped planar member with a plurality of holes or apertures therein. Fourth rim panel is made of rigid meshed material or apertured material that is a strong rigid sheet of material with a plurality of holes, gaps, openings, slits, slots, perforations, vents, or similar to form a meshed material or apertured material. Fourth rim panel has a width, overall length, a thickness, a first edge, a second edge, a third edge, and a fourth edge. The first edge of fourth rim panel is the longest edge of the trapezoid. The first edge of fourth rim panel is a vertical member, as depicted. The first edge of fourth rim panel is rigidly attached to the fourth edge of face panel so that the plane of fourth rim panel is perpendicular to the plane of face panel. Rigid attachment may be accomplished by any known means such as: brake bending, pressed seam, weld, solder, glue, epoxy, adhesive, bolts, screws, rivets, clips, snaps, pins, or fasteners. In best mode, face panel and fourth rim panel are made from the same sheet of material and the two panel are made by bending a single piece of material into the two panels.

First exterior flange panel is a rigid trapezoid shaped planar member with a plurality of holes or apertures therein. First exterior flange panel is made of rigid meshed material or apertured material that is a strong rigid sheet of material with a plurality of holes, gaps, openings, slits, slots, perforations, vents, or similar to form a meshed material or apertured material. First exterior flange panel has a width, overall length, a thickness, a first edge, a second edge, a third edge, and a fourth edge. The third edge of first exterior flange panel is the longest edge of the trapezoid. The third edge of first exterior flange panel is a horizontal member, as depicted. The third edge of first exterior flange panel is rigidly attached to the third edge of first rim panel so that the plane of first exterior flange panel is perpendicular to the plane of first rim panel and parallel with the plane of the face panel without overlapping with face panel, wherein the first exterior flange panel bends away from the face panel, as depicted.

Rigid attachment may be accomplished by any known means such as: brake bending, pressed seam, weld, solder, glue, epoxy, adhesive, bolts, screws, rivets, clips, snaps, pins, or fasteners. In best mode, first rim panel and first exterior flange panel are made from the same sheet of material and the two panel are made by bending a single piece of material into the two panels.

Second exterior flange panel is a rigid trapezoid shaped planar member with a plurality of holes or apertures therein. Second exterior flange panel is made of rigid meshed material or apertured material that is a strong rigid sheet of material with a plurality of holes, gaps, openings, slits, slots, perforations, vents, or similar to form a meshed material or apertured material. Second exterior flange panel has a width, overall length, a thickness, a first edge, a second edge, a third edge, and a fourth edge. The third edge of second exterior flange panel is the longest edge of the trapezoid. The third edge of first exterior flange panel is a vertical member, as depicted. The third edge of second exterior flange panel is rigidly attached to the third edge of second rim panel so that the plane of second exterior flange panel is perpendicular to the plane of second rim panel and parallel with the plane of face panel without overlapping with face panel, wherein the first exterior flange panel bends away from the face panel, as depicted.

Rigid attachment may be accomplished by any known means such as: brake bending, pressed seam, weld, solder, glue, epoxy, adhesive, bolts, screws, rivets, clips, snaps, pins, or fasteners. In best mode, second rim panel and second exterior flange panel are made from the same sheet of material and the two panel are made by bending a single piece of material into the two panels.

Third exterior flange panel is a rigid trapezoid shaped planar member with a plurality of holes or apertures therein. Third exterior flange panel is made of rigid meshed material or apertured material that is a strong rigid sheet of material with a plurality of holes, gaps, openings, slits, slots, perforations, vents, or similar to form a meshed material or apertured material. Third exterior flange panel has a width, overall length, a thickness, a first edge, a second edge, a third edge, and a fourth edge. The third edge of third exterior flange panel is the longest edge of the trapezoid. The third edge of third exterior flange panel is a horizontal member, as depicted. The third edge of third exterior flange panel is rigidly attached to the third edge of third rim panel so that the plane of third exterior flange panel is perpendicular to the plane of third rim panel and parallel with the plane of face panel without overlapping with face panel, wherein the first exterior flange panel bends away from the face panel, as depicted.

Rigid attachment may be accomplished by any known means such as: brake bending, pressed seam, weld, solder, glue, epoxy, adhesive, bolts, screws, rivets, clips, snaps, pins, or fasteners. In best mode, third rim panel and third exterior flange panel are made from the same sheet of material and the two panel are made by bending a single piece of material into the two panels.

Fourth exterior flange panel is a rigid trapezoid shaped planar member with a plurality of holes or apertures therein. Fourth exterior flange panel is made of rigid meshed material or apertured material that is a strong rigid sheet of material with a plurality of holes, gaps, openings, slits, slots, perforations, vents, or similar to form a meshed material or apertured material. Fourth exterior flange panel has a width, overall length, a thickness, a first edge, a second edge, a third edge, and a fourth edge. The third edge of fourth exterior flange panel is the longest edge of the trapezoid. The third edge of fourth exterior flange panel is a vertical member, as depicted. The third edge of fourth exterior flange panel is rigidly attached to the third edge of fourth rim panel so that the plane of fourth exterior flange panel is perpendicular to the plane of fourth rim panel and parallel with the plane of face panel without overlapping with face panel, wherein the first exterior flange panel bends away from the face panel, as depicted.

Rigid attachment may be accomplished by any known means such as: brake bending, pressed seam, weld, solder, glue, epoxy, adhesive, bolts, screws, rivets, clips, snaps, pins, or fasteners. In best mode, fourth rim panel and fourth exterior flange panel are made from the same sheet of material and the two panel are made by bending a single piece of material into the two panels.

In best mode, the entire nine panel mesh insert 10 is made from a single rectangular or square sheet of material wherein first all four corners of the sheet of material are cut off diagonally at a 45-degree angle. Then a rim panel and a flange panel are formed out of each of the remaining four tabs left over from the corner cut. This method produces the nine panel mesh insert 10 described above with one square or rectangular face panel, four trapezoidal rim panels, and four trapezoidal exterior flange panels. This design creates a mesh insert with superior strength and durability.

Each of the plurality of nine panel mesh insert fasteners 12 is a fastener, such as, a screw, bolt, nut, washer, rivet, anchor, nail, pin, clip, snap, or any other type of known fastener. To install nine panel mesh insert 10, each of the plurality of nine panel mesh insert fasteners 12 is inserted through a hole or aperture in the nine panel mesh insert 10 and secured to the door 100 in this way. This installation method insures maximum strength to the design. The essence of this invention is not the type of fastener used. Any known fastener may be used. In best mode, elevator bolts with a male and female end are used because elevator bolts are very strong and have flat heads that may be concealed easily by the interior and exterior trim assemblies 20,22.

Figure 2:
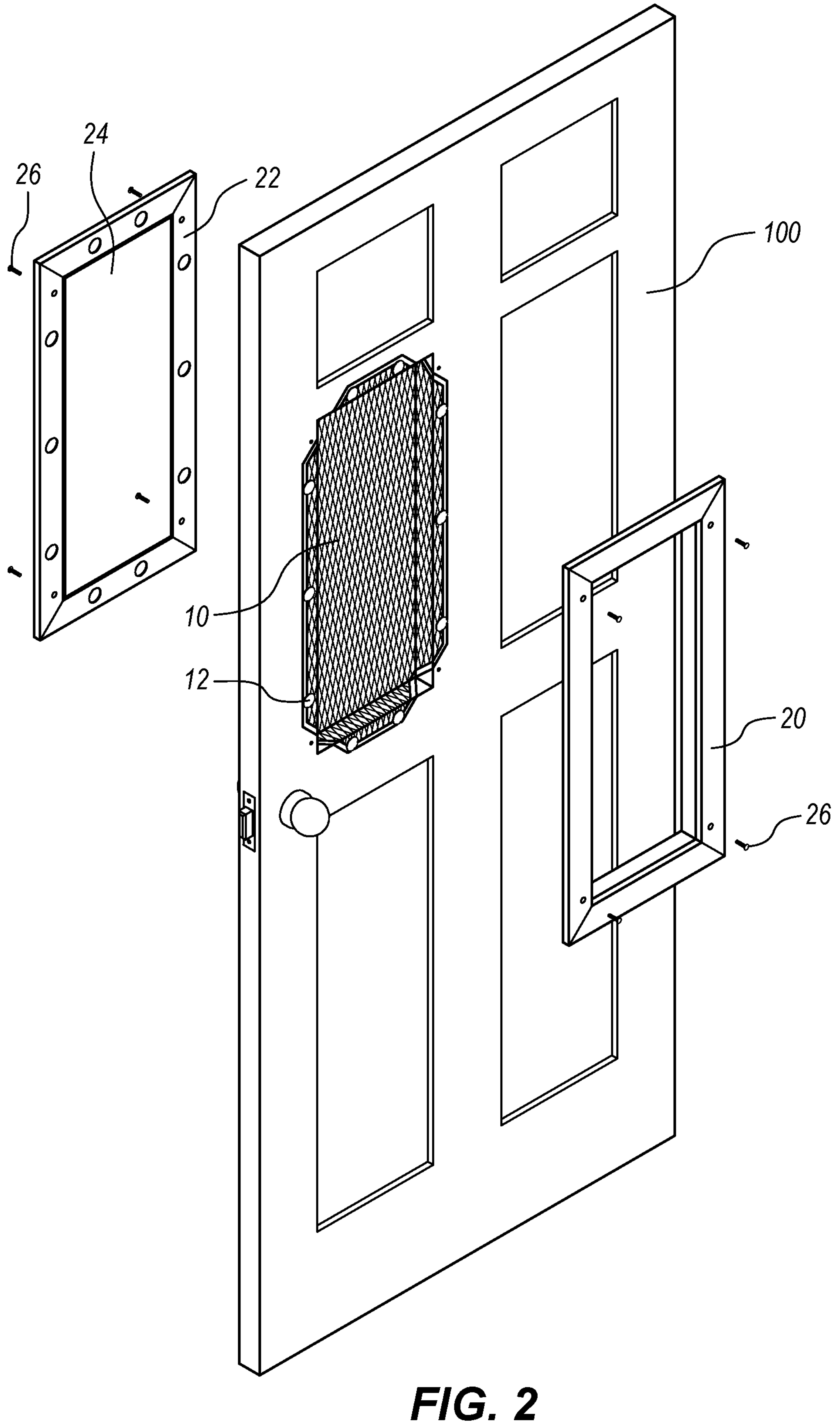
FIG. 2 is a perspective assembly view of security mesh insert and a door with the nine panel mesh insert installed in or fastened to the door.
Figure 3:
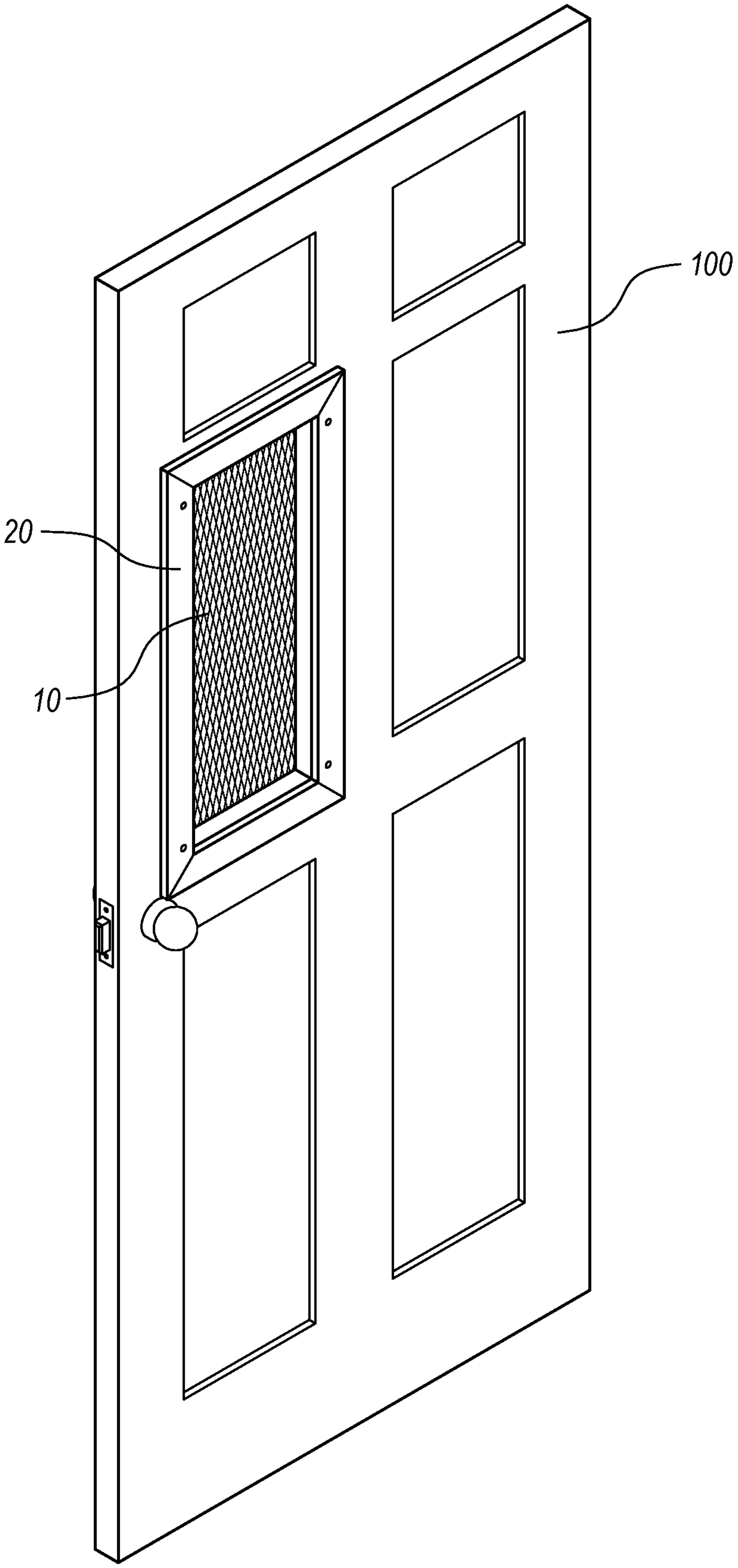
FIG. 3 is a perspective view of security mesh insert installed into a door, viewed from the exterior side of the door.
Figure 4:
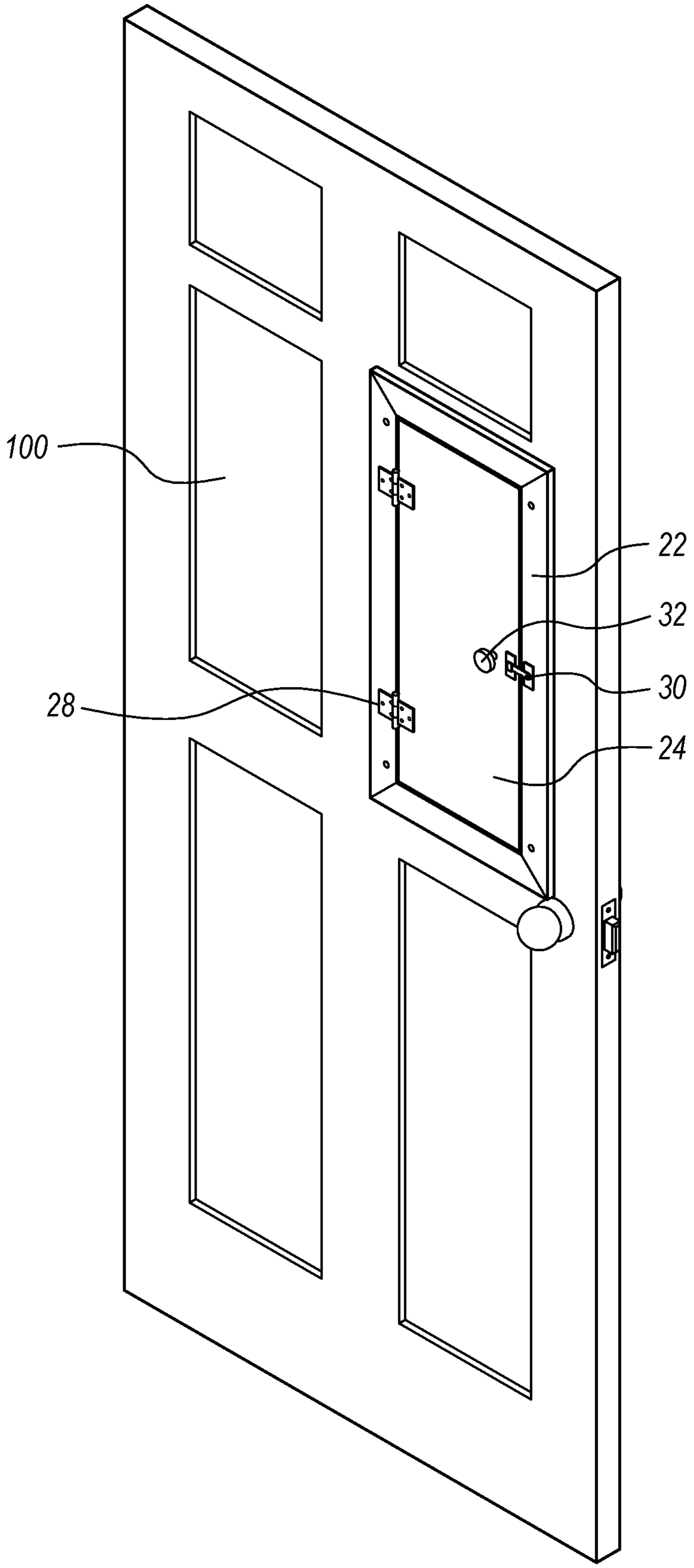
FIG. 4 is a perspective view of security mesh insert installed into a door, viewed from the interior side of the door, with the interior hatch door closed.
Figure 5:
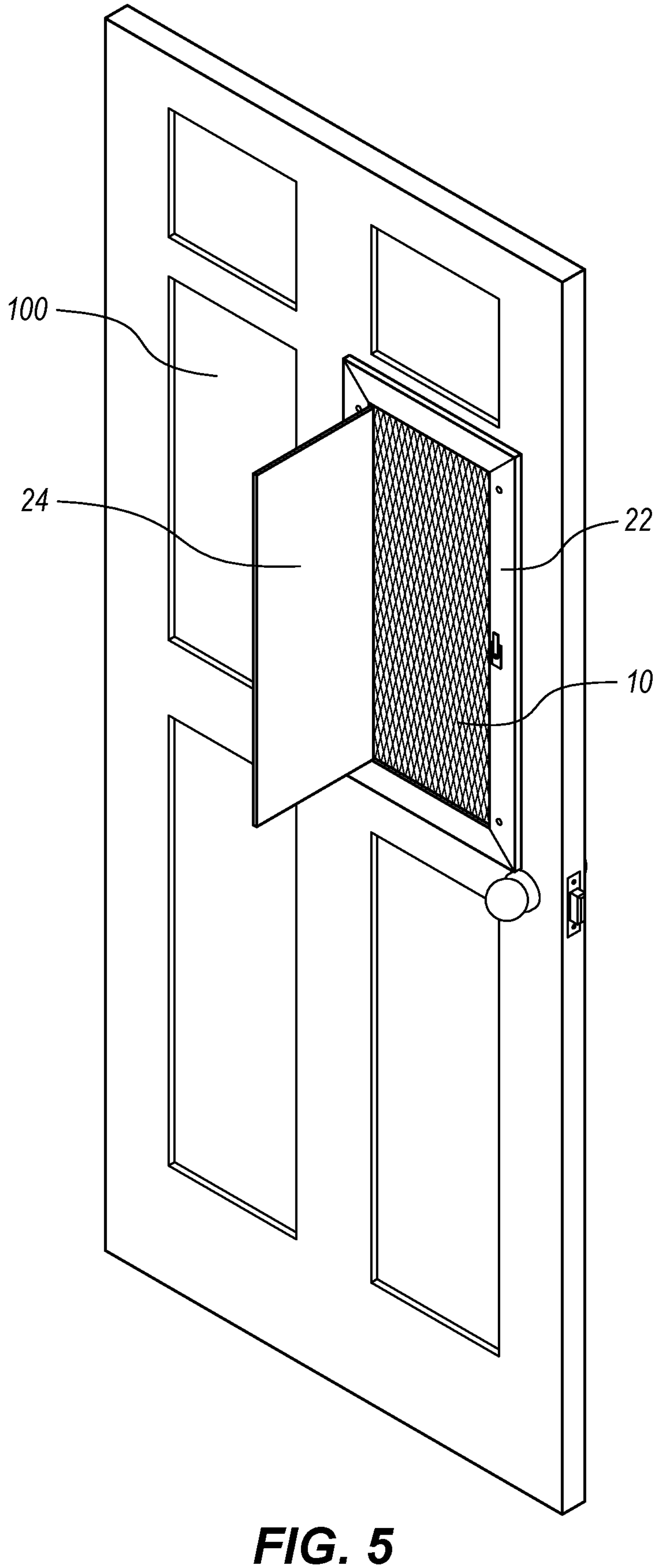
FIG. 5 is a perspective view of security mesh insert installed into a door, viewed from the interior side of the door, with the interior hatch door open.

Exterior trim assembly 20 is a square or rectangular frame assembly that is the exterior trim for the nine panel mesh insert 10. Exterior trim assembly 20 is a decorative molding, framing, or casing around the nine panel mesh insert 10 that is used to cover the four exterior flanges of the nine panel mesh insert 10 and the nine panel mesh insert fasteners 12. Exterior trim assembly 10 may be made of any known material such as: metal, steel, aluminum, polymer, plastic, composite, wood, fiberglass, ceramic, carbon fiber, or any other known material. Exterior trim assembly comprises: a first trim piece with a first and second end, a second trim piece with a first and second end, a third trim piece with a first and second end, and a fourth trim piece with a first and second end. Each trim piece is a board or a long, thin, flat piece of wood or other hard material. Optionally, each trim piece may be an angular member or biplanar member with an L-shaped cross section, wherein first, second, third, and fourth pieces of trim are each lengths of angle material with an L-shaped cross section. This mode is depicted in FIGS. 1-3. With this mode, the angular trim pieces cover the first, second, third, and fourth rim panels of nine panel mesh insert 10 when installed, whereas the prior mode of planar exterior trim pieces leave the first, second, third, and fourth rim panels of nine panel mesh insert 10 exposed. This option is preferred because it add more strength to the design.

First trim piece is the upper horizontal member of exterior trim assembly 20 that is closest to the ceiling of room. Second trim piece is the right vertical member of exterior trim assembly 20 as viewed from the exterior side of the door 100. The third trim piece is the lower horizontal member of exterior trim assembly 20 that is closest to the floor of the room. The fourth trim piece is the left vertical edge of exterior trim assembly 20 as viewed from the exterior side of door 100. The first end of first trim piece is connected to the first end of fourth trim piece so that first and fourth trim pieces form a right angle. The second end of first trim piece is connected to the first end of second trim piece so that the first and second trim pieces form a right angle. The second end of second trim piece is connected to the first end of the third trim piece so that the second and third trim pieces form a right angle. The second end of third trim piece is connected to the second end of fourth trim piece so that the third and fourth trim pieces form a right angle.

Interior trim assembly 22 is a square or rectangular frame assembly that is the interior trim for the nine panel mesh insert 10. Interior trim assembly 22 is a decorative molding, framing, or casing around the nine panel mesh insert that is used to cover the interior edges of the nine panel mesh insert 10 and the nine panel mesh insert fasteners 12. Interior trim assembly 22 may be made of any known material such as: metal, steel, aluminum, polymer, plastic, composite, wood, fiberglass, ceramic, carbon fiber, or any other known material. Interior trim assembly comprises: a first trim piece with a first and second end, a second trim piece with a first and second end, a third trim piece with a first and second end, and a fourth trim piece with a first and second end. Each trim piece is a board or a long, thin, flat piece of wood or other hard material.

First trim piece is the upper horizontal member of interior trim assembly that is closest to the ceiling of room. Second trim piece is the right vertical member of interior trim assembly 22 as viewed from the interior side of the door 100. The third trim piece is the lower horizontal member of interior trim assembly 22 that is closest to the floor of the room. The fourth trim piece is the left vertical edge of interior trim assembly 22 as viewed from the exterior side of door 100. The first end of first trim piece is connected to the first end of fourth trim piece so that first and fourth trim pieces form a right angle. The second end of first trim piece is connected to the first end of second trim piece so that the first and second trim pieces form a right angle. The second end of second trim piece is connected to the first end of the third trim piece so that the second and third trim pieces form a right angle. The second end of third trim piece is connected to the second end of fourth trim piece so that the third and fourth trim pieces form a right angle.

Security mesh insert for door comprises may further comprise an interior hatch door 24. Interior hatch door 24 is a rigid square or rectangular member with a width, a length, a thickness, an interior surface, and an exterior surface. The length and width of interior hatch door 24 are similar to that of face panel of nine panel mesh insert 10. Interior hatch door 24 is a door or hatch. Interior hatch door 24 may be made of any known material such as: metal, steel, aluminum, polymer, plastic, composite, wood, fiberglass, ceramic, carbon fiber, or any other known material. Interior hatch door 24 functions swings open and close. In the closed position, interior hatch door 24 completely covers the face panel to prevent anyone on the exterior side of the door 100 from seeing through the door 100 or viewing the interior of the room. In the closed position, interior hatch door 24 also helps prevent sound from transferring from inside the room to the exterior of the room and vice versa. In the open position, interior hatch door 24 does not cover the face panel so that sound may freely transfer through the nine panel mesh insert 10 and also air may circulate and freely transfer through the nine panel mesh insert 10.

Each of the plurality of trim fasteners 26 is a fastener, such as, a screw, bolt, nut, washer, rivet, anchor, nail, pin, clip, snap, or any other type of known fastener. The essence of this invention is not the type of fastener used. Any known fastener may be used. In best mode, wood screws are used to fasten the exterior trim assembly 20 and the interior trim assembly 32 to the door 100.

Interior hatch door 24 further comprises one or more hinges 28. Interior hatch door 24 is pivotally attached to the interior trim assembly by one or more hinges 28, wherein a first portion of hinge 28 is rigidly attached to the interior surface of the interior hatch door 24 and a second portion of hinge 28 is rigidly attached to the interior trim assembly 22. Each hinge 28 is a bearing joint or mechanism that provides a pivotal connection between the interior hatch door 24 and the interior trim assembly 22. Each hinge 28 is a hinge in the common of the word and the common definition of the word.

Interior hatch door 24 further comprises a latch 30. Latch 30 is rod, bar, catch, or mechanism that fastens or locks the interior hatch door 24 closed and prevents the interior hatch door 24 from being pushed open from the exterior side of the door 100. Any known type of latch or door latch may be used for latch 30. Latch 30 is slidably attached to the interior surface of the interior hatch door 24 using one or more trim fasteners 26.

Optionally, interior hatch door 24 may further comprise a knob 32. Knob 32 is a handle or ball that is used to grasp onto by the user in order to open or close the interior hatch door 24. Knob 32 is rigidly attached to the interior surface of interior hatch door 24 using one or more trim fasteners 26.

Security mesh insert for door may be installed into any door 100, including solid doors or hollow doors. Security mesh insert for door is installed into a door 100 as follows. First a rectangular or square hole is cut into the door 100. The length and width of the rectangular or square hole in the door 100 should be equivalent to or slightly larger than the length and width of face panel of nine panel mesh insert 10. Then the nine pane mesh insert 10 is aligned with the rectangular or square hole in the door 100 and the nine pane mesh insert 10 is press fit into the rectangular or square hole in the door 100 or otherwise inserted and installed into the rectangular or square hole in the door 100. Special care must be taken to cut the exact size rectangular or square hole in the door 100 to allow for the proper press fit between the nine pane mesh insert 10 and the rectangular or square hole in the door 100. Next, the nine pane mesh insert 10 is secured to the door 100 using a plurality of nine panel mesh insert fasteners 12 by inserting each nine panel mesh insert fastener 12 through an aperture or hole in the first flange panel, the second flange panel, the third flange panel, and the fourth flange panel. In best mode, nine panel mesh insert fasteners 12 are spaced out at about 3-10 inches part. In best mode pilot holes are first drilled into the door 100 prior to installing the nine panel mesh insert fasteners 12. Nine panel mesh insert fasteners 12 are installed around the full perimeter of the nine pane mesh insert 10 as depicted. To insure proper strength, nine panel mesh insert fasteners 12 should be spaced at 8 inches or less. Next, the exterior trim assembly 20 is aligned with the installed nine pane mesh insert 10 on the exterior side of the door 100 and the exterior trim assembly 20 attached to the exterior side of the door 100 using a plurality of trim fasteners 26. In best mode pilot holes are first drilled into the door 100 and the exterior trim assembly 20 prior to installing trim fasteners 26. Next, the interior trim assembly 22 is aligned with the installed nine pane mesh insert 10 on the interior side of the door 100 and the interior trim assembly 22 attached to the interior side of the door 100 using a plurality of trim fasteners 26. In best mode pilot holes are first drilled into the door 100 and the interior trim assembly 22 prior to installing trim fasteners 26. Next, the interior hatch door 24 is installed by pivotally attaching the interior hatch door 24 to the exterior trim assembly 24. The interior hatch door 24 is usually attached to the fourth trim piece of exterior trim assembly 20 using one or more trim fasteners 26. Finally, the latch 30 is installed by slidably attaching latch 30 onto the exterior surface of interior hatch door 24 so that latch 30 may be slid to lock interior hatch door 24 and slid to unlock interior hatch door 24. A guide portion of latch 30 may also need to be rigidly attached to the exterior surface of the interior trim assembly 22.

As stated, when properly installed, security mesh insert for door has been extensively tested to withstand multiple hard blows from a sledge hammer without breach or breaking. People on the interior side of security mesh insert for door may rest easy knowing that their door is virtually impenetrable because of security mesh insert for door while still allowing for and benefitting from air flow and sound travel between security mesh insert for door.

What is claimed is:

1. A security mesh insert for a door comprising: a nine panel mesh insert; a plurality of nine panel mesh insert fasteners; an exterior trim assembly; an interior trim assembly; and a plurality of trim fasteners, wherein, said nine panel mesh insert comprises: a face panel; a first rim panel; a second rim panel; a third rim panel; a fourth rim panel; a first exterior flange panel; a second exterior flange panel; a third exterior flange panel; and a fourth exterior flange panel, wherein, said face panel is a rigid rectangular or square shaped planar member with a plurality of holes or apertures therein, said face panel has a width, length, a thickness, first edge, a second edge, a third edge, and a fourth edge, said first rim panel is a rigid trapezoid shaped planar member with a plurality of holes or apertures therein, said first rim panel has a width, overall length, a thickness, a first edge, a second edge, a third edge, and a fourth edge, said second rim panel is a rigid trapezoid shaped planar member with a plurality of holes or apertures therein, said second rim panel has a width, overall length, a thickness, a first edge, a second edge, a third edge, and a fourth edge, said third rim panel is a rigid trapezoid shaped planar member with a plurality of holes or apertures therein, said third rim panel has a width, overall length, a thickness, a first edge, a second edge, a third edge, and a fourth edge, said fourth rim panel is a rigid trapezoid shaped planar member with a plurality of holes or apertures therein, said fourth rim panel has a width, overall length, a thickness, a first edge, a second edge, a third edge, and a fourth edge, said first exterior flange panel is a rigid trapezoid shaped planar member with a plurality of holes or apertures therein, said first exterior flange panel has a width, overall length, a thickness, a first edge, a second edge, a third edge, and a fourth edge, said second exterior flange panel is a rigid trapezoid shaped planar member with a plurality of holes or apertures therein, said second exterior flange panel has a width, overall length, a thickness, a first edge, a second edge, a third edge, and a fourth edge, said third exterior flange panel is a rigid trapezoid shaped planar member with a plurality of holes or apertures therein, said third exterior flange panel has a width, overall length, a thickness, a first edge, a second edge, a third edge, and a fourth edge, said fourth exterior flange panel is a rigid trapezoid shaped planar member with a plurality of holes or apertures therein, said fourth exterior flange panel has a width, overall length, a thickness, a first edge, a second edge, a third edge, and a fourth edge, said first edge of said first rim panel is rigidly attached to said first edge of said face panel so that said first rim panel is perpendicular to said face panel, said first edge of said second rim panel is rigidly attached to said second edge of said face panel so that said second rim panel is perpendicular to said face panel, said first edge of said third rim panel is rigidly attached to said third edge of said face panel so that said third rim panel is perpendicular to said face panel, said first edge of said fourth rim panel is rigidly attached to said fourth edge of said face panel so that said fourth rim panel is perpendicular to said face panel, said third edge of said first exterior flange panel is rigidly attached to said third edge of said first rim panel so that said first exterior flange panel is: perpendicular to said first rim panel, parallel to said face panel, but does not overlap with said face panel, and bends away from said face panel, said third edge of said second exterior flange panel is rigidly attached to said third edge of said second rim panel so that said second exterior flange panel is: perpendicular to said second rim panel, parallel to said face panel, but does not overlap with said face panel, and bends away from said face panel, said third edge of said third exterior flange panel is rigidly attached to said third edge of said third rim panel so that said third exterior flange panel is: perpendicular to said third rim panel, parallel to said face panel, but does not overlap with said face panel, and bends away from said face panel, said third edge of said fourth exterior flange panel is rigidly attached to said third edge of said fourth rim panel so that said fourth exterior flange panel is: perpendicular to said fourth rim panel, parallel to said face panel, but does not overlap with said face panel, and bends away from said face panel, each of said plurality of nine panel mesh insert fasteners is a fastener, screw, bolt, nut, washer, rivet, anchor, nail, pin, clip, or snap, said plurality of nine panel mesh insert fasteners is used to rigidly attach said nine panel mesh insert to a door, said exterior trim assembly is a square or rectangular frame assembly, said exterior trim assembly comprises: a first trim piece with a first and second end, a second trim piece with a first and second end, a third trim piece with a first and second end, and a fourth trim piece with a first and second end, wherein, said first end of said first trim piece of said exterior trim assembly is connected to said first end of said fourth trim piece of said exterior trim assembly so that said first and fourth trim pieces said exterior trim assembly form a right angle, said second end of said first trim piece of said exterior trim assembly is connected to said first end of said second trim piece of said exterior trim assembly so that said first and second trim pieces said exterior trim assembly form a right angle, said second end of said second trim piece of said exterior trim assembly is connected to said first end of said third trim piece of said exterior trim assembly so that said second and third trim pieces said exterior trim assembly form a right angle, said second end of said third trim piece of said exterior trim assembly is connected to said second end of said fourth trim piece of said exterior trim assembly so that said third and fourth trim pieces said exterior trim assembly form a right angle, said interior trim assembly is a square or rectangular frame assembly, said interior trim assembly comprises: a first trim piece with a first and second end, a second trim piece with a first and second end, a third trim piece with a first and second end, and a fourth trim piece with a first and second end, wherein, said first end of said first trim piece of said interior trim assembly is connected to said first end of said fourth trim piece of said interior trim assembly so that said first and fourth trim pieces of said interior trim assembly form a right angle, said second end of said first trim piece of said interior trim assembly is connected to said first end of said second trim piece of said interior trim assembly so that said first and second trim pieces of said interior trim assembly form a right angle, said second end of said second trim piece of said interior trim assembly is connected to said first end of said third trim piece of said interior trim assembly so that said second and third trim pieces of said interior trim assembly form a right angle, said second end of said third trim piece of said interior trim assembly is connected to said second end of said fourth trim piece of said interior trim assembly so that said third and fourth trim pieces of said interior trim assembly form a right angle, each of said plurality of trim fasteners is a fastener, screw, bolt, nut, washer, rivet, anchor, nail, pin, clip, or snap, and said plurality of trim fasteners is used to rigidly attach said exterior trim assembly and said interior trim assembly to said door.

2. A security mesh insert for a door as recited in claim 1 further comprising: an interior hatch door; one or more hinges, and a latch, wherein, said interior hatch door is a rigid square or rectangular member with a width, a length, a thickness, an interior surface, and an exterior surface, said one or more hinges is a bearing joint or mechanism that provides a pivotal connection, said one or more hinges has a first portion and a second portion, said first portion of said one or more hinges is rigidly attached to said interior surface of said interior hatch door and said second portion of said one or more hinges is rigidly attached to said interior trim assembly, said latch is a rod, bar, catch, or mechanism that fastens or locks said interior hatch door shut, and said latch is slidably attached to said interior surface of said interior hatch door.

* * * * *